United States Patent
Hwang et al.

(10) Patent No.: US 6,646,730 B2
(45) Date of Patent: Nov. 11, 2003

(54) APPARATUS FOR INSPECTING COLLIMATOR

(75) Inventors: Myeon-soon Hwang, Suwon (KR); Hong-suk Sun, Suwon (KR); Byung-gon Kim, Seoul (KR); Myoung-woon Kim, Seoul (KR); Suk-chan Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/217,480

(22) Filed: Aug. 14, 2002

(65) Prior Publication Data
US 2003/0151737 A1 Aug. 14, 2003

(30) Foreign Application Priority Data
Feb. 14, 2002 (KR) .......................................... 2002-7992

(51) Int. Cl.[7] .................................................. G01B 9/00
(52) U.S. Cl. ..................................................... 356/124
(58) Field of Search ................................ 356/124–127; 385/33, 34, 74, 77, 80, 138, 139, 124, 93, 51, 59, 116, 117, 119

(56) References Cited

U.S. PATENT DOCUMENTS

| | | | |
|---|---|---|---|
| 5,004,346 A | | 4/1991 | Kühel |
| 5,163,107 A | * | 11/1992 | Garriss .......................... 385/74 |
| 5,299,272 A | * | 3/1994 | Buchin .......................... 385/34 |
| 5,841,591 A | | 11/1998 | Zhu et al. |

* cited by examiner

Primary Examiner—Michael P. Stafira
(74) Attorney, Agent, or Firm—Staas & Halsey LLP

(57) ABSTRACT

An apparatus for inspecting a collimator including a pigtail to which a fiber is connected to transmit an optical signal, a GRIN lens coaxially arranged with the pigtail, a glass tube accommodating and supporting the pigtail and the GRIN lens, and a metal sleeve protecting the glass tube, comprising an inspection table; a grip part provided on the inspection table, and gripping the collimator to be inspected; a first camera provided over the grip part having an axis perpendicular to a length of the collimator, and photographing the collimator along the length of the collimator; a second camera arranged coaxially with the collimator on the inspection table, and photographing the collimator perpendicular to an axis of the collimator; and a displaying part connected to the first and second camera, and displaying pictures transmitted from the first and second cameras. With this configuration, an apparatus for inspecting a collimator, which can effectively inspect the collimator, is provided, thereby increasing the reliability of the collimator.

25 Claims, 9 Drawing Sheets

APPARATUS FOR INSPECTING COLLIMATOR

CROSS-REFERENCE TO RELATED APPLICATION(S)

This application claims the benefit of Korean Application No. 2002-7992, filed Feb. 14, 2002, in the Korean Intellectual Property Office, the disclosure of which is incorporated herein by reference.

BACKGROUND OF THE INVENTION

1. Field of the Invention

The present invention relates in general to an apparatus for inspecting a collimator.

2. Description of the Related Art

A collimator is an optical communication device collimating a ray emitted from a light source. The collimator is used as a component in equipment such as optical communication equipment, semiconductor manufacturing equipment, etc., which may need parallel light.

As shown in FIG. 1, a collimator 10 is generally comprised of a pigtail 12 and a GRIN lens 14 which are coaxially arranged, a glass tube 15 accommodating and supporting the pigtail 12 and the GRIN lens 14, and a metal sleeve 16 protecting the glass tube 15.

The pigtail 12 is made of glass, and a fiber 13 forming a path of an incident ray is connected therethrough from one end part thereof. On another end part of the pigtail 12 is formed an inclined part 12a, having a predetermined inclination angle.

Further, the GRIN lens 14 is provided with an inclined part 14a on one end thereof in correspondence with the inclined part 12a of the pigtail 12.

To manufacture the collimator 10 having the above configuration, the GRIN lens 14 is first inserted into the glass tube 15, and fastened therein. The end part of the GRIN lens 14, which is formed with the inclined part 14a, is located inside the glass tube 15, and another end part thereof protrudes out of the glass tube 15 by a predetermined length.

After the GRIN lens 14 is accommodated in and supported by one side of the glass tube 15, the pigtail 12 is inserted in another side of the glass tube 15. The end part of the pigtail 12 which is formed with the inclined part 12a is accommodated inside the glass tube 15, mating with the inclined part 14a of the GRIN lens 14, which is accommodated inside the glass tube 15.

At this time, the inclined part 12a of the pigtail 12 is aligned so as to obtain desired optical properties, and then the pigtail 12 is fastened inside the glass tube 15.

Thereafter, the glass tube 15 accommodating and supporting the GRIN lens 14 and the pigtail 12 is inserted into a metal sleeve 16, and then the glass tube 15 is fastened onto the metal sleeve 16 by applying an epoxy resin 17 to one end of the metal sleeve 16, so as to complete the collimator 10.

However, there has not been proposed an apparatus for inspecting the collimator 10.

Therefore, the length of the protruding part of the GRIN lens 14, the amount and shape of an epoxy resin 17, etc., have been inspected with the naked eye. Further, to inspect the angle alignment, the spot alignment, etc. between the GRIN lens 14 and the pigtail 12 is not possible, thereby decreasing the reliability of the collimator 10.

SUMMARY OF THE INVENTION

Accordingly, an apparatus for inspecting a collimator effectively is provided, thereby increasing the reliability of the collimator.

Additional objects and advantages of the invention will be set forth in part in the description which follows and, in part, will be obvious from the description, or may be learned by practice of the invention.

This and other objects of the present invention may be accomplished by an apparatus for inspecting a collimator including a pigtail to which a fiber is connected to transmit an optical signal, a GRIN lens coaxially arranged with the pigtail, a glass tube accommodating and supporting the pigtail and the GRIN lens, and a metal sleeve protecting the glass tube, comprising an inspection table; a grip part provided on the inspection table, and gripping the collimator to be inspected; a first camera provided over the grip part having an axis perpendicular to a length of the collimator, and photographing the collimator along the length of the collimator; a second camera arranged coaxially with the collimator on the inspection table, and photographing the collimator perpendicular to an axis of the collimator; and a displaying part connected to the first camera and the second camera, and displaying pictures transmitted from the first camera and the second camera.

One end of the glass tube and one end of the metal sleeve may be fastened to each other with an epoxy resin, and the picture photographed by the first camera and displayed on the displaying part may show at least one of a length of the GRIN lens, and an amount and a shape of the epoxy resin.

The picture photographed by the second camera and displayed on the displaying part may show an angle alignment between the GRIN lens and the pigtail.

The apparatus may further comprise a light source connected to the fiber and emitting an optical signal to a fiber; and an optical signal sensor arranged coaxially with the collimator on the inspection table, and receiving the optical signal from the light source through the collimator.

The optical signal sensor may be connected to the displaying part, and a picture photographed by the optical signal sensor and displayed on the displaying part may show a spot alignment between the GRIN lens and the pigtail.

The apparatus may further comprise a sliding block slidably supporting the optical signal sensor and the second camera; a driving part slidably moving a sliding block so that the optical signal sensor and the second camera alternately aligned with an axis of the collimator; and a rail provided on the inspection table and guiding a movement of the sliding block.

The apparatus may further comprise a control part controlling the first camera and the second camera, the displaying part, the light source, the optical signal sensor, and a driving part.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
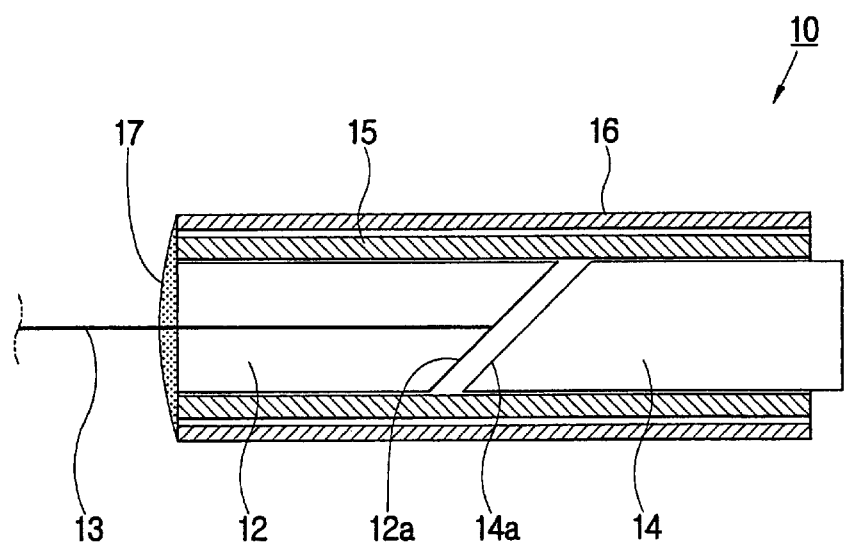
FIG. 1 is a sectional view of a collimator.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
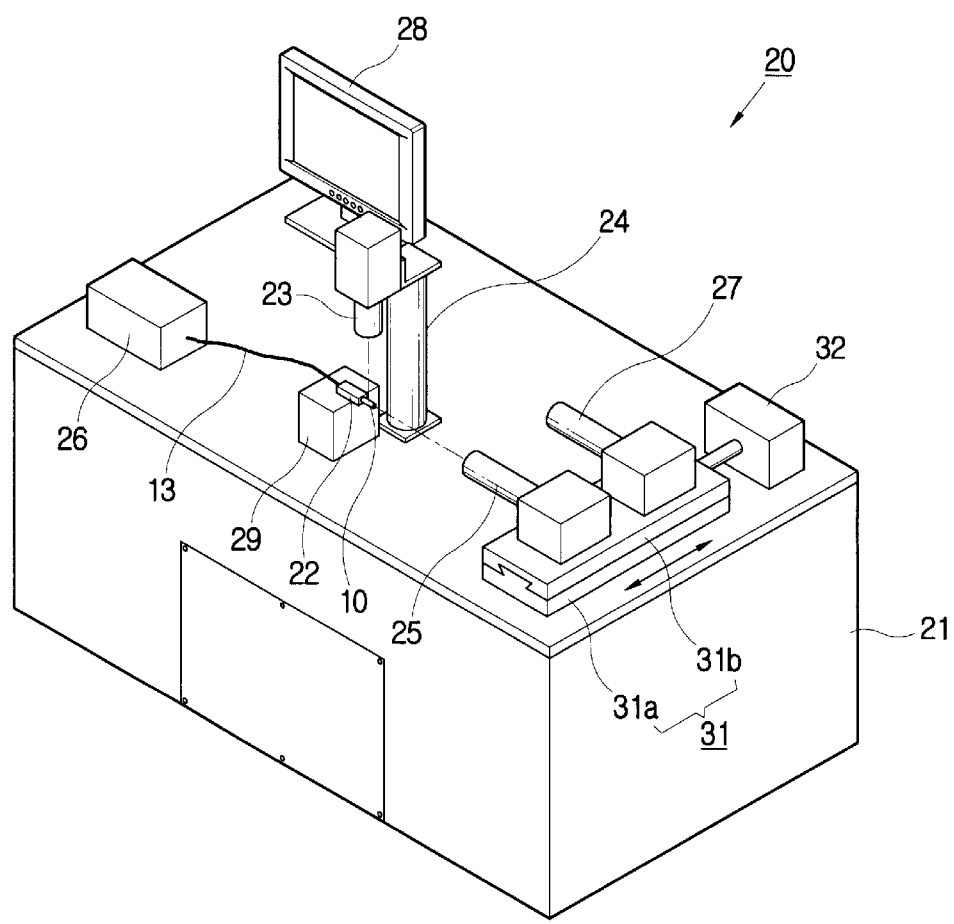
FIG. 2 is a perspective view of an apparatus according to an embodiment of the present invention for inspecting the collimator.

As shown in FIG. 2, an apparatus 20 for inspecting the collimator 10 comprises an inspection table 21, a grip part 22 provided on a grip block 29 and gripping the collimator 10 to be inspected on the inspection table 21, a first camera 23 having an axis perpendicular to a length of the collimator, and photographing the collimator along the length of the collimator and a second camera 25 arranged coaxially with the collimator on the inspection table, and photographing the collimator perpendicular to an axis of the collimator, an optical signal sensor 27 inspecting a spot alignment of the collimator 10 in cooperation with a light source 26, and a displaying part 28 displaying pictures transmitted from the first camera 23 and second camera 25, as the result of inspecting the collimator 10.

Figure 6:
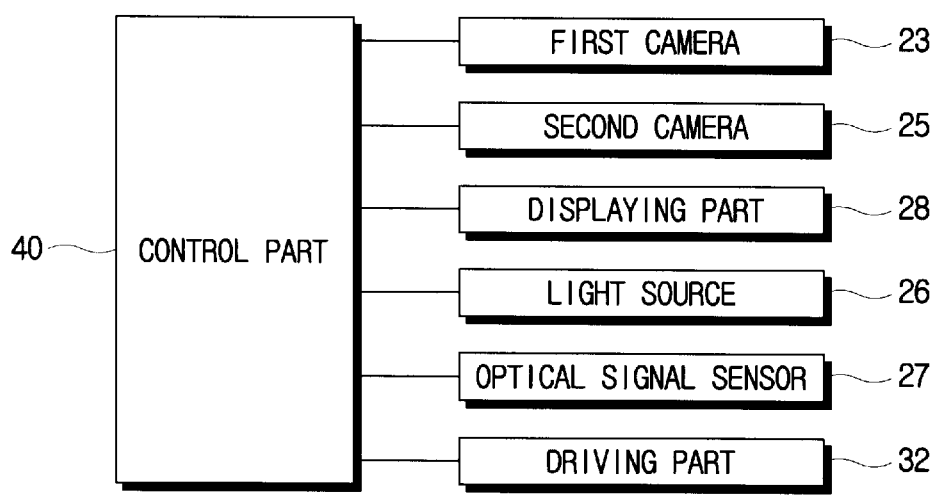
FIG. 6 is a control block diagram of an apparatus according to another embodiment of the present invention for inspecting the collimator.

Under the inspection table 21 is provided a control part 40 (refer to FIG. 6) controlling a driving part 32 (to be described later). On the bottom of the inspection table 21 may be provided roller wheels moving the apparatus 20 for inspecting the collimator 10 to any desired location. The roller wheels may be preferably provided with a brake preventing the apparatus 20 for inspecting the collimator 10 from an arbitrary movement.

Figure 3A:
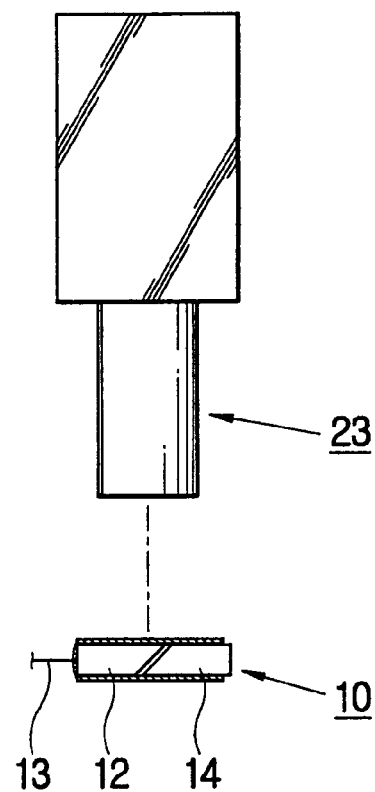
FIG. 3A illustrates schematically a state in which the collimator is photographed by a first camera of FIG. 2.

The first camera 23 is combined with a supporting bracket 24 fixedly standing up on the inspection table 21, so as to be disposed above an upper surface of the grip part 22. The collimator 10 to be inspected is gripped perpendicular to an axis of the collimator by the grip part 22. As shown in FIG. 3A, the first camera 23 photographs the collimator 10 perpendicularly to a lengthwise direction of the collimator 10.

Figure 3B:
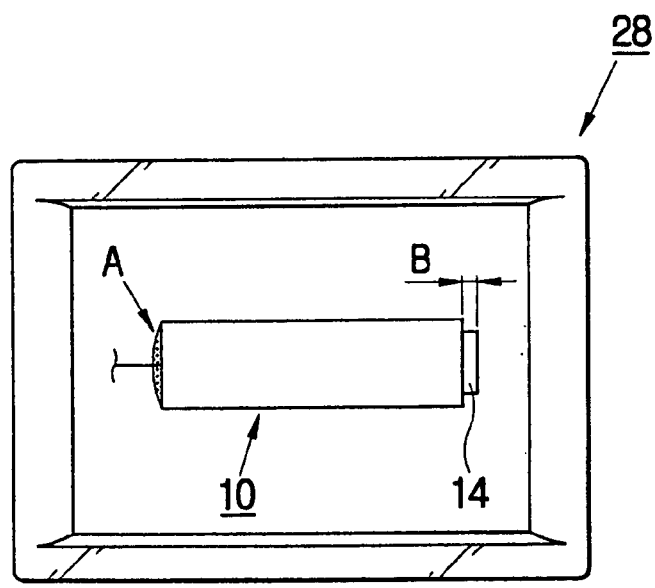
FIG. 3B illustrates a picture displayed on a displaying part through the photographing process of FIG. 3A.

As shown in FIG. 3B, a picture of the collimator 10 photographed by the first camera 23 and displayed on the displaying part 28 shows a length B of the GRIN lens 14 protruding out of the metal sleeve 16 (refer to FIG. 1) and the amount and shape A of the epoxy resin 17 fastening the glass tube 15 (refer to FIG. 1) inside the metal sleeve 16.

Figure 4A:
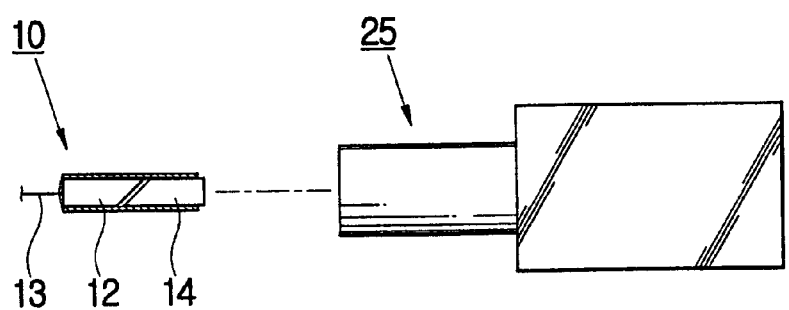
FIG. 4A illustrates schematically a state in which the collimator is photographed by a second camera of FIG. 2.
Figure 4B:
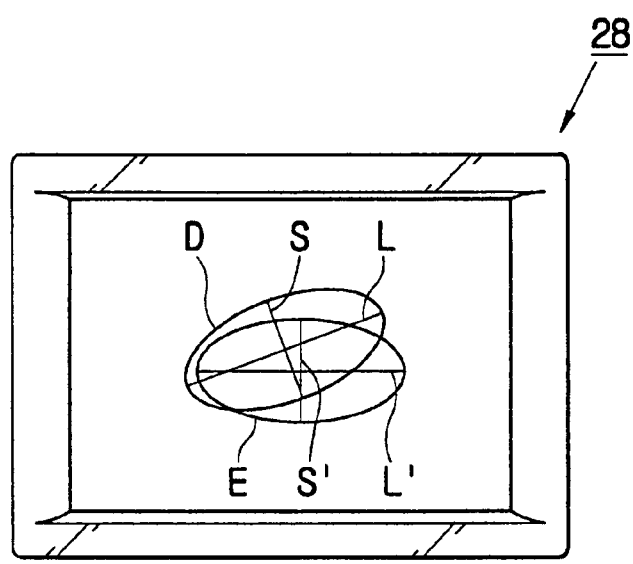
FIG. 4B illustrates a picture displayed on the displaying part, through the photographing process of FIG. 4A.

The second camera 25 is provided in front of the collimator 10 gripped by the grip part 22, so as to be disposed coaxially with the collimator 10, and provides pictures of the collimator 10 along an axial direction (refer to FIG. 4A). As shown in FIG. 4B, the picture of the collimator 10 photographed by the second camera 25 and displayed on the displaying part 28 shows an angle alignment between the GRIN lens 14 and the pigtail 12 which are accommodated in the glass tube 15.

Beside the second camera 25 is provided an optical signal sensor 27 in parallel with the second camera 25. The optical signal sensor 27 inspects a spot alignment between the GRIN lens 14 and the pigtail 12 on the displaying part 28 in cooperation with the light source 26.

The fiber 13 extends from the collimator 10 passing through the grip part 22 and is connected to the light source 26 located in back of the collimator 10.

Figure 5A:
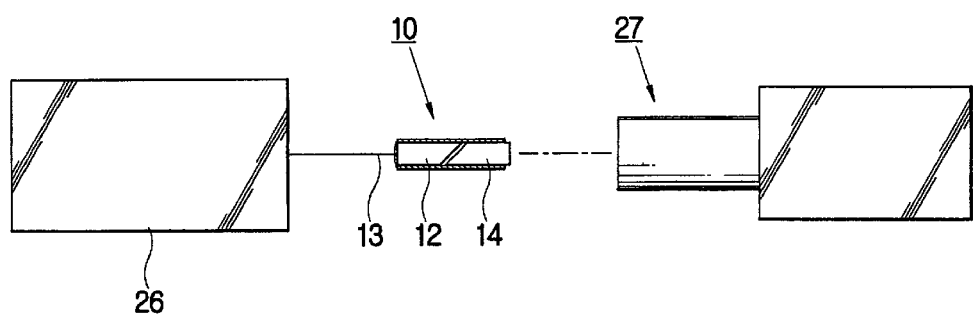
FIG. 5A illustrates schematically a state in which the collimator is inspected by an optical signal sensor of FIG. 2.

Thus, an optical signal is transmitted from the light source 26 through the fiber 13, and emitted to the optical signal sensor 27 passing through the pigtail 12 and GRIN lens 14. Then, the optical signal sensor 27 receives the optical signal and displays the optical signal on the displaying part 28 as a picture (refer to FIG. 5A). The picture of the collimator 10 inspected by the optical signal sensor 27 and displayed on the displaying part 28 shows a spot alignment between the pigtail 12 and the GRIN lens 14, which is represented as a spot (refer to FIG. 5B).

With respect to the first camera 23, if the grip part 22 and the supporting bracket 24 are fixedly located on the table, there is no necessity to move the first camera 23. However, with respect to the second camera 25 and the optical signal sensor 27, to allow the second camera 25 and the optical signal sensor 27 to alternately inspect the collimator 10, movement of the second camera 25 and the optical signal sensor 27 may be required. Herein, the second camera 25 and the optical signal sensor 27 alternately should be located in front of the collimator 10, so as to be coaxially aligned therewith.

To move the second camera 25 and the optical signal sensor 27, a sliding part 31 is provided, so that the optical signal sensor and the second camera can be alternately aligned with an axis of the collimator. The sliding part 31 comprises a rail 31a having a dovetail shape and provided on the inspection table 21, and a sliding block 31b is slidably engaged with the rail 31a and movable on the rail 31. On the sliding block 31b the second camera 25 and the optical signal sensor 27 are provided.

Besides the sliding part 31, a driving part 32 is provided to slide the sliding block 31b on the rail 31a under the control of the control part 40.

Thus, in order to inspect the collimator 10 by the second camera 25, the control part 40 controls the driving part 32 to move the sliding block 31b on the rail 31a a predetermined distance until the second camera 25 and the collimator 10 are coaxially arranged, and then the second camera 25 inspects the collimator 10.

Similarly, to inspect the collimator 10 through the optical signal sensor 27, the control part 40 controls the driving part 32 to move the sliding block 31b on the rail 31a a predetermined distance until the optical signal sensor 27 and the collimator 10 are coaxially arranged, and then the optical signal sensor 27 inspects the collimator 10 in cooperation with the light source 26.

With this configuration, the process of inspecting the collimator 10 in the apparatus 20 according to the present invention will be described hereinbelow.

First, the collimator 10 to be inspected is gripped by the grip part 22. The grip part 22 may be provided with a stopper (not shown) to position the collimator 10. Then, the fiber 13, which is connected to the collimator 10, is connected to the light source 26.

After gripping the collimator 10 and connecting the fiber 13, the first camera 23 starts to photograph the collimator 10. That is, as shown in FIG. 3A, the first camera photographs the collimator 10 perpendicularly to a lengthwise direction of the collimator 10.

As shown in FIG. 3B, the picture of the collimator 10 photographed by the first camera 23 shows the length B of the GRIN lens 14, which protrudes out of the metal sleeve 16 and the applied amount and shape A of the epoxy resin 17, which fastens the glass tube 15 inside the metal sleeve 16, and the picture is displayed on the displaying part 28.

Then, the control part 40 compares the length B of the GRIN lens 14, which protrudes out of the metal sleeve 16 and the applied amount and shape A of the epoxy resin 17, which fastens the glass tube 15 inside the metal sleeve 16 with a reference length of the GRIN lens, which protrudes out of a metal sleeve and an applied amount and shape of an epoxy resin of a predetermined reference picture, and displays a result of the comparison on the displaying part 28, so that a user can inspect the quality of the collimator 10 with the naked eye.

After the inspection of the first camera 23 is finished, the driving part 32 moves the sliding block 31b on the rail 31a a predetermined distance in response to a control signal from the control part 40, so that the second camera 25 and the collimator 10 are coaxially arranged.

Then, as shown in FIG. 4A, the second camera 25 photographs the collimator 10 axially. As shown in FIG. 4B, the picture of the collimator 10 photographed by the second camera 25 and displayed on the displaying part 28 shows the angle alignment between the GRIN lens 14 and the pigtail 12 both of which are accommodated in the glass tube 15.

As described above, the pigtail 12 and the GRIN lens 14 face each other at inclined parts 12a and 14a, respectively. The inclined parts 12a and 14a must be arranged to have a predetermined distance therebetween and a predetermined orientation to each other. That is, as shown in FIG. 4B, the difference between a first ellipse D caused by the inclined part 12a of the pigtail 12, and a second ellipse E caused by the inclined part 14a of the GRIN lens 14 must be within a predetermined allowable range, respectively. Therefore, the control part 40 compares the first ellipse D with the second ellipse E on the basis of long axes L and L' and short axes S and S' thereof, and displays a result of the comparison on the displaying part 28, and a user can determine the quality of the collimator 10.

After the inspection of the second camera 25 is finished, the optical signal sensor 27 starts to inspect the collimator 10 in cooperation with the light source 26. At this time, the control part 40 controls the driving part 32 to move the sliding block 31b on the rail 31a a predetermined distance, so that the optical signal sensor 27 and the collimator 10 are coaxially arranged on a coaxial line.

Figure 5B:
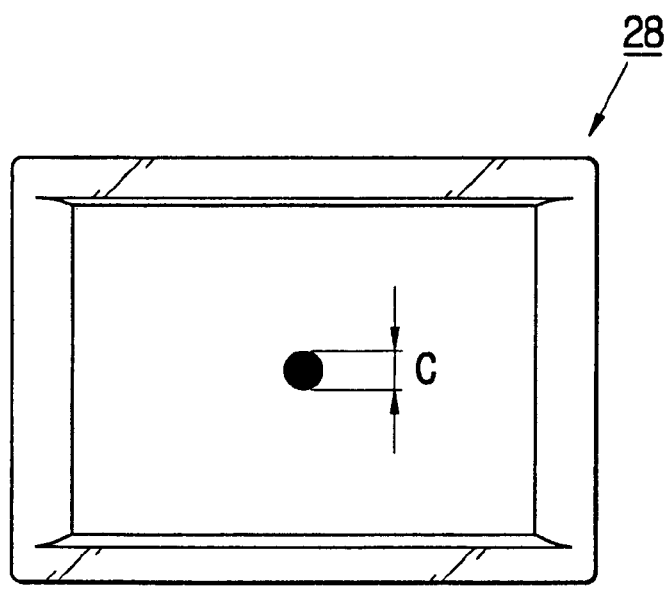
FIG. 5B illustrates a picture displayed on the displaying part, through the inspecting process of FIG. 5A.

After the optical signal sensor 27 and the collimator 10 are coaxially arranged, the optical signal is transmitted from the light source 26 through the fiber 13, and emitted to the optical signal sensor 27 after passing through the pigtail 12 and the GRIN lens 14. Then, the optical signal sensor 27 receives the optical signal and displays a picture corresponding to the optical signal on the displaying part 28 as a corresponding picture. The corresponding picture of the collimator 10 inspected by the optical signal sensor 27 and displayed on the displaying part 28 shows the spot alignment between the pigtail 12 and the GRIN lens 14. Because the collimator 10 is used in collimating light, the ray incident through the fiber 13 is emitted to the outside in parallel by passing through the pigtail 12 and the GRIN lens 14. A spot aligning state, as shown in FIG. 5B, is represented as a spot.

The spot displayed on the displaying part 28 is inspected for a diameter C and a shape thereof. Thus, the control part 40 compares the spot pictured by the optical signal sensor 27 with a predetermined reference spot for the diameter and the shape, and displays a result of the comparison on the displaying part 28, so that a user can inspect the quality of the collimator 10 with the naked eye.

As described above, the apparatus 20 for inspecting the collimator 10 is provided to correctly inspect the quality of the collimator 10, thereby increasing reliability of the collimator 10.

The second camera 25 and the optical signal sensor 27 are moved to an inspection position by the sliding part 31. However, the second camera 25 may be fixedly located and only the optical signal sensor 27 may be moved, or vice versa.

The first camera 23, the second camera 25, and the optical signal sensor 27 inspect the collimator 10 sequentially. However, the inspection order may be changed as necessary.

Further, the above-described first and second cameras 23 and 25, the displaying part 28, the light source 26, the optical signal sensor 27, the driving part 32 are all controlled by the control part 40 automatically. An interface such as a touch screen may be used to control the above-described components in response to the picture displayed on the displaying part 28.

As described above, an apparatus for inspecting a collimator is provided, which can effectively inspect the collimator, thereby increasing the reliability of the collimator.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for inspecting a collimator which includes a pigtail to which a fiber is connected to transmit an optical signal, a GRIN lens coaxially arranged with the pigtail, a glass tube accommodating and supporting the pigtail and the GRIN lens, and a metal sleeve protecting the glass tube, the apparatus comprising:
    an inspection table;
    a grip part provided on the inspection table, and gripping the collimator to be inspected;
    a first camera provided over the grip part having an axis perpendicular to a length of the collimator, and photographing the collimator along the length of the collimator;
    a second camera arranged coaxially with the collimator and photographing the collimator perpendicular to an axis of the collimator; and
    a displaying part connected to the first camera and the second camera, and displaying pictures transmitted from the first camera and the second camera.

2. The apparatus according to claim 1, wherein the picture photographed by the second camera and displayed on the displaying part shows an angle alignment between the GRIN lens and the pigtail.

3. The apparatus according to claim 1, wherein one end of the glass tube and one end of the metal sleeve are fastened to each other with an epoxy resin, and
    the picture photographed by the first camera and displayed on the displaying part shows at least one of a length of the GRIN lens and an amount and a shape of the epoxy resin.

4. The apparatus according to claim 3, wherein the picture photographed by the second camera and displayed on the displaying part shows an angle alignment between the GRIN lens and the pigtail.

5. The apparatus according to claim 1, further comprising:
a light source connected to the fiber and emitting an optical signal to the fiber; and
an optical signal sensor arranged coaxially with the collimator and receiving the optical signal from the light source through the collimator.

6. The apparatus according to claim 5, wherein the optical signal sensor is connected to the displaying part, and
a picture photographed by the optical signal sensor and displayed on the displaying part shows a spot alignment between the GRIN lens and the pigtail.

7. The apparatus according to claim 5, further comprising:
a sliding block slidably supporting the optical signal sensor and the second camera;
a driving part slidably moving the sliding block so that the optical signal sensor and the second camera alternately aligned with an axis of the collimator; and
a rail guiding a movement of the sliding block.

8. The apparatus according to claim 1, further comprising:
a control part controlling the first camera and the second camera, and the displaying part.

9. The apparatus according to claim 5, further comprising:
a control part controlling the first camera and the second camera, the displaying part, the light source, and the optical signal sensor.

10. The apparatus according to claim 7, further comprising:
a control part controlling the first camera and the second camera, the displaying part, the light source, the optical signal sensor, and the driving part.

11. An apparatus for inspecting a collimator which includes a pigtail to which a fiber is connected to transmit an optical signal, a GRIN lens coaxially arranged with the pigtail, a glass tube accommodating and supporting the pigtail and the GRIN lens, and a metal sleeve protecting the glass tube, the apparatus comprising:
an inspection table;
a grip part connected to the inspection table, and gripping the collimator to be inspected;
a first camera provided in the vicinity of the grip part having an axis perpendicular to a length of the collimator, and producing first images of the collimator along the length of the collimator;
a second camera provided in the vicinity of the grip part having an axis alignable with the axis of the collimator to produce second images of the collimator perpendicular to an axis of the collimator; and
a control part connected to the first camera and the second camera and evaluating based on the first images and second images whether physical properties of the collimator surpass a predetermined threshold.

12. The apparatus according to claim 11, wherein at least one of the physical properties evaluated is a length of the GRIN lens protruding from the glass tube or an amount and a shape of epoxy resin in a vicinity of the pigtail fastening the glass tube inside the metal sleeve.

13. The apparatus according to claim 11, wherein at least one of the physical properties evaluated is an angle alignment between the GRIN lens and the pigtail.

14. The apparatus according to claim 11, further comprising:
a light source providing light, which passes through the collimator; and
an optical sensor arrangeable coaxially to inspect a spot alignment of the collimator in cooperation with the light source; and a displaying part displaying images corresponding to images transmitted from the first camera and second camera, as a result of inspecting the collimator.

15. The apparatus according to claim 14, further comprising:
a sliding block slidably supporting the optical signal sensor and the second camera;
a driving part slidably moving the sliding block so that the optical signal sensor and the second camera alternately aligned with the axis of the collimator; and
a rail guiding a movement of the sliding block.

16. The apparatus according to claim 11, wherein the control part controls the first camera and the second camera, the first camera having an axis perpendicular to the length of the collimator, and photographing the collimator along the length of the collimator and a second camera arranged coaxially with the collimator on the inspection table, and photographing the collimator.

17. A method of inspecting a collimator which includes a pigtail to which a fiber is connected to transmit an optical signal, a GRIN lens coaxially arranged with the pigtail, a glass tube accommodating and supporting the pigtail and the GRIN lens, and a metal sleeve protecting the glass tube, the method comprising:
gripping the collimator to be inspected;
providing first images of a length of the collimator with a first camera having an axis perpendicular to a length of the collimator;
aligning a second camera with an axis of the collimator;
providing second images of the collimator perpendicular to the axis of the collimator with a second camera after the second camera is aligned; and
evaluating based on the first images and second images whether physical properties of the collimator surpass a predetermined threshold.

18. A method for inspecting a collimator which includes a pigtail to which a fiber is connected to transmit an optical signal, a GRIN lens coaxially arranged with the pigtail, a glass tube accommodating and supporting the pigtail and the GRIN lens, and a metal sleeve protecting the glass tube, the method comprising:
gripping a collimator to be inspected;
providing first images of a length of the collimator with a first camera having an axis perpendicular to a length of the collimator;
providing second images of the collimator perpendicular to an axis of the collimator using a second camera, which is alignable with the axis of the collimator; and
displaying images corresponding to the first images and the second images so as to evaluate whether physical properties of the collimator surpass a predetermined threshold.

19. The method according to claim 18, further comprising:
sensing the angle alignment between the GRIN lens and the pigtail by receiving the optical signal from a light source through the collimator.

20. The method according to claim 18, further comprising:
slidably moving an optical signal sensor and the second camera into and out of position to alternately enable alignment of an optical signal sensor and a second camera with the axis of the collimator, to alternately provide the second images and the sensing of the angle alignment, respectively.

21. The method according to claim 20, wherein the optical signal sensor and the second camera have axes which are parallel with each other.

22. The apparatus according to claim 16, wherein the control part compares the images corresponding to an arrangement of the GRIN lens and the pigtail to determine whether the arrangement of the GRIN lens and the pigtail is within a predetermined range.

23. The method according to claim 19, wherein the displaying includes showing a spot alignment between the GRIN lens and the pigtail.

24. The method according to claim 19, wherein the spot displayed on the display part provide by the optical signal sensor is compared with a predetermined reference spot for a diameter and a shape thereof.

25. The apparatus according to claim 16, wherein the control part compares the images corresponding to an arrangement of the GRIN lens and the pigtail to determine whether the arrangement of the GRIN lens and the pigtail is within a predetermined range.

* * * * *